United States Patent [19]

Müller et al.

[11] Patent Number: 5,407,689

[45] Date of Patent: Apr. 18, 1995

[54] PROCESS FOR THE PRODUCTION OF A SEASONING SAUCE FROM BREAD

[75] Inventors: Rudi Müller, Sinsheim; Johann Bohatiel, Wuestrenrot; Doris Blortz, Ilsfeld; Barbara Frank, Flein, all of Germany

[73] Assignee: CPC International Inc., Englewood Cliffs, N.J.

[21] Appl. No.: 134,243

[22] Filed: Oct. 8, 1993

[51] Int. Cl.⁶ .............................................. A23L 1/22
[52] U.S. Cl. ........................................ 426/18; 426/46
[58] Field of Search ................................... 426/18, 46

[56] References Cited

U.S. PATENT DOCUMENTS

| | | | |
|---|---|---|---|
| 3,711,303 | 1/1973 | Luksas et al. | 99/145 |
| 3,912,822 | 10/1975 | Yokotsuka et al. | 426/44 |
| 4,028,470 | 6/1977 | Hayashi et al. | 426/11 |
| 4,115,591 | 9/1978 | Noda et al. | 426/7 |
| 5,141,756 | 8/1992 | Bajracharya et al. | 426/46 |

FOREIGN PATENT DOCUMENTS 0417481 3/1991 European Pat. Off.

OTHER PUBLICATIONS

JPO Abstracts, Abstracting JP58-193677, Abstract Publication date Feb. 8, 1984.
JPO Abstracts, Abstracting JP58-138356, Abstract Publication date Nov. 9, 1983.
JPO Abstracts, Abstracting JP57-186461, Abstract Publication date Feb. 10, 1983.
JPO Abstracts Abstracting JP56-60966, Abstract Publication date Mar. 19, 1982.
Patent Abstracts of Japan, vol. 1, No. 111 (C-027), 26 Sep. 1976 & JP-A-52 076 488 (Kikkoman).

*Primary Examiner*—Joseph Golian

[57] ABSTRACT

A process for the production of a seasoning sauce in which an enzyme-containing, fungus-covered substrate comprising divided bread of wheat gluten. The substrate is mashed with salt water, the mash is subjected to a three stage fermentation and then clarified by squeezing pasturing and filtration.

7 Claims, No Drawings

PROCESS FOR THE PRODUCTION OF A SEASONING SAUCE FROM BREAD

BACKGROUND OF THE INVENTION

1. Field of the Invention

The invention relates to a process for the production of a seasoning sauce from bread, which is similar to known soy sauces, and the product therefrom.

2. Description of the Related Art

It is well known to produce soy sauce by a fermentation process in which soybeans, in the form of whole beans or crushed defatted soybeans, and optionally wheat, usually in the form of a roasted coarse meal, and salt are used in varying proportions. Depending upon the kind of malt utilized, an enzyme-containing, fungus-covered substrate, referred to as koji, is initially produced. The koji is then mashed with salt water and subjected to a multi-step fermentation, which comprises a combined hydrolytic process with lactic acid, alcoholic fermentation, and a maturing phase. The fermentation organisms used for the koji production are the hypha fungi of the strain Aspergillus oryzae or A. soyae. The salt-tolerant lactococci Pedoicoccus halophilus, and the yeast Zygosaccharomyces rouxii are preferred for the fermentation phase.

Contrary to previously known methods, where the natural accompanying flora effected the fermentation, modern processes use defined starter cultures. In the case of naturally fermented sauces no mineral acid is employed for accelerating the decomposition of the raw plant materials. This is done exclusively be means of enzymatic hydrolysis effected by the fungal enzymes formed during the koji phase. In recent developments, immobilized enzymes or immobilized microorganisms are used for fermentation. However, when the fermentation period is shortened and the salt content is reduced during processing, particularly during mashing, the taste qualities of the sauces thus achieved are not as good as those produced by the former process. After a prolonged maturing phase (approximately 3 to 6 months) the mash is refined by squeezing, heating, turbidity sedimenting and layer filtration so as to yield the stable ready-to-eat sauce. The traditionally prepared sauce has a dark color and a salty and full, roasty and malty flavor which is somewhat unfamiliar to Western taste.

JP-A-52-76488 describes a process for the production of a seasoning sauce based on protein-containing raw materials such as soybeans, soybean protein, wheat, barley, wheat gluten, corn gluten, fish protein, milk protein, etc., and carbohydrate-containing raw materials such as sorghum, rice bran, wheat bran, potato, molasses, starch residues, etc., from which a koji is made using suitable koji organisms, particularly Aspergillus soyae and Aspergillus oryzae. The koji is then fermented in a saline solution at temperatures between 30° and -55° C.

In U.S. Pat. No. 4,115,591, a process is described for the production of a koji. A koji fungus is cultivated in a modified koji substrate at a temperature of 20° to 40° C. for 30 to 100 hours in the presence of 0.05 to 8% of a salt of an aliphatic carboxylic acid having up to 4 carbon atoms. The koji substrate is selected from the group consisting of soybeans, defatted soybeans, glutamine, rice, wheat, wheat bran, barley, oats, corn, fish meal and other products. The resulting koji is used for producing fermented food products such as soy sauce, miso and sake, by fermentation in a 22% salt solution at 30° C. for 150 days.

EP-A-417 481 describes a process for the production of a soy sauce by means of fermentation on the basis of a koji produced by fermenting a mixture of comminuted soybeans and wheat by means of a koji culture. The koji is hydrolyzed in aqueous suspension with enzymes obtained during the fermentation with the koji culture, at 45° to 60° C. for 3 to 8 hours, whereupon, after the addition of sodium chloride to obtain a salt content of 15 to 19%, the mixture is subjected to a four to eight week fermentation.

U.S. Pat. No. 3,912,822 describes a process for the production of a protein hydrolyzate, having a high glutamic acid content, which is obtained by adding a glutaminase together with a proteolytic enzyme to a protein-containing staring material such as soybeans or wheat gluten.

Agric. Biol. Chem. 49, 745–750 (1985) describes the growth and respiration coefficient of the fungus Aspergillus oryzae, the fungus being cultivated on a solids substrate. Bread is used as the solids substrate. The resulting koji is not fermented any further.

An object of the present invention is to produce a seasoning sauce similar to soy sauce, but which has a lighter color, a high glutamate content, is less roasty as regards taste and more neutral but harmonious so as to be better adapted to the Western trend of taste and which has the lowest possible salt content. Another object was to shorten the production process to a period of less than 3 months.

It has now been surprisingly found that the problems according to the invention can be solved by use of certain process controls using raw materials not traditionally employed for soy sauce fermentation, namely by using an enzyme-containing, fungus-covered substrate (koji) of divided bread of wheat gluten. According to the invention, the koji is mashed with water that is relatively low in salt and then subjected to fermentation, which is carried out in several steps.

SUMMARY OF THE INVENTION

The process according to the present invention, is a process for the production of a seasoning sauce, in which an enzyme-containing, fungus-covered substrate is initially mashed with water containing sodium chloride, the mash is subjected to fermentation for a prolonged period of time and then clarified by squeezing, pasteurizing and filtration. The process is characterized in that a) bread containing wheat gluten is used as the substrate, b) mashing is carried out with low-salt water, so that the salt content in the mash is from about 4 to about 12%, preferably from about 7 to about 8%, and c) the fermentation is carried out in several steps at temperatures decreasing from about 40° to about 45° C. in the first step to room temperature in the last step over a period of from 8 to 12 weeks.

DETAILED DESCRIPTION

The present process provides for the production of a seasoning sauce which is similar to soy sauce, but is lighter in color, exhibits a high glutamate content and has a less roasty flavor. The process provides for a koji, an enzyme-containing, fungus-covered substrate, to be mashed with salt water, fermenting the resulting mash over a prolonged period of time, and then clarifying, squeezing, pasteurizing and filtering. The process is unique in that the substrate used is comprised of bread made with wheat gluten, the mashing is carried out in salt water, wherein the salt is present in a relatively low amount, specifically from about 4 to about 12% by weight, and the fermentation is carried out in a number of steps, during which the temperature decreases.

The enzyme-containing, fungus-covered substrate used as the starting material and referred to as koji in technical language, is produced in any conventional manner, provided however, that divided bread of wheat gluten is used as the protein-containing raw material. For example, it is possible to proceed in the manner described in EP-A1-417 481. For the present invention, it is useful to employ a starter culture, preferably *Aspergillus oryzae*. A dense mycelium forms on the substrate, and this enzyme-containing, fungus-covered substrate, referred to briefly as koji, is then mashed with water containing sodium chloride and subjected to fermentation. It is also possible to add a yeast fungus, preferably *Zygosaccharomyces rouxii*, during fermentation. In the fermentation phase, the koji enzymes are activated by the initial elevated temperature, so that no further enzyme addition is necessary to accelerate the process.

The starting material used is preferably bread made of from about 20 to about 80% by weight, of wheat gluten (80% protein), preferably from about 30 to about 60% by weight, and about 80 to about 20% by weight of wheat flour and/or other additives such as oat flakes, leguminous flour, lactoprotein and/or yeast extract, water and raising agents. The bread is subjected to koji production and fermentation in the form of slices or cubes. The bread is produced according to known processes by baking, extrusion or by boiling. In order to preserve and store the bread, it can be frozen as one piece or air dried after dividing it into pieces. After thawing or rehydrating, the bread is used as if it were fresh bread. The bread texture (moisture, porosity) represents a good substrate for solids fermentation, and the starter fungus, *Aspergillus oryzae*, produces a dense mycelium on this gluten-rich substrate, which covers the crumb surface. In particular, the proteolytic enzymes including the glutaminases are activated during the koji phase.

According to the invention, the bread is subjected to mashing which is carried out using salt water. A weight ratio of koji to salt water of approximately 1:1 to 1:5 is generally observed. The salt content of the salt water used for mashing is generally from about 4 to about 12%, preferably from about 7 to about 8% by weight.

According to one embodiment, the presently claimed process proceeds such that the fermentation is carried out in three steps. The first step is at a temperature of from about 40° to about 45° C. for a period of from about 4 to about 14 days, preferably about 8 to about 12 days. The second step is at a temperature of from about 28° to about 32° C. for from about 2 to about 4 weeks, and the third step is at room temperature, from about 18° to about 25° C. for from about 2 to about 6 weeks.

According to a preferred embodiment of this process, it proceeds in such a way that the initial fermentation step is initiated while slowly heating to the fermentation temperature of from about 40° to about 45° C., and takes place for a period of about 3 to 5 days, and is then carried out at this temperature for about 4 to 14 days. In this case, the thermolabile glutaminase activity is utilized to an optimum degree.

According to the process known from U.S. Pat. No. 3,912,822, a high glutamate content can only be achieved when enzymes are added. However, an even higher glutamate content is obtained according to the present invention without enzyme addition.

The well-calculated use of bread for koji fermentation produces a surprisingly high hydrolytic enzyme activity, particularly a high glutaminase activity, the released glutamine being converted into glutamate at a high level in the later stages of fermentation. According to the present invention, this is possible without adding additional enzymes and without using an especially selected glutaminase-active microorganism.

The rapid protein degradation manifests itself in a high amino nitrogen value (AN) as compared to the total nitrogen (TN), and an AN/TN ratio of from about 0.55 to about 0.6 is usually achieved within about 6 days. Monosodium glutamate (MSG) is preferably released from the protein. In contrast to pyroglutamic acid, MSG has an enhancing effect, and an MSG/TN ratio of about 1.3 to about 1.7 is obtained by the process according to the present invention. In soy sauce this value is usually not greater than 1.0, and for the process set forth in U.S. Pat. No. 3,912,822, an amount of 0.86 glutamate is indicated, which corresponds to 1.08 MSG/TN, even though pure wheat gluten is used therein. This is in contrast to the substrate of the present invention which consists only partly of wheat gluten.

After fermentation, the mature mash is processed as usual by press-filtration, heating and optionally clarification by membrane filtration. The clear seasoning liquid can be concentrated, mixed with salt and other carrier substances, vacuum-dried and/or spray-dried.

The following examples are to further illustrate the present invention but are not meant to be limiting in any way. The meets and bounds of the invention which are set forth in the claims below.

EXAMPLE 1

150 g of wheat gluten (protein content 80%) were mixed with the same amount of wheat flour (Type 550) as well as 15 g of raising agent and kneaded into a firm dough, while about 225 ml of water were added. The dough was shaped into bread and baked thoroughly at 220° until it had adopted a light color.

The bread was cut into cubes which were inoculated with 1% of a spore suspension of *Aspergillus oryzae* (culture obtained from the German collection of microorganisms, Braunschweig, DSM 1863).

The cubes were then fermented on trays at 30° C. for about 70 hours, with high humidity and intense aeration of the substrate having to be ensured, until a dense white mycelium grew.

The substrate was mashed with 1.5 times the amount of salt water in a fermentation vessel, so that the mash had a salt content of 7%. Accompanied by occasional thorough mixing the batch was initially kept at 30° C. for 3 days and then at 42° C. for another 12 days. During this time the mash liquefied swiftly and a monosodium glutamate/nitrogen ratio of 1.4 was measured when the nitrogen content was 1.9%.

Then, the yeast *Zygosaccharomyces rouxii* (salt-adapted, obtained from the German collection of microorganisms, Braunschweig, DSM 2531) was used for inoculation and the mash was allowed to ferment at 30° C. for 14 days. The alcohol content increased to 2.0% in this phase, and the pH was lowered from an initial value of 5.8 to about 5.1.

For the purpose of maturing, storage at room temperature for 4 weeks was favorable. For processing, the mash was squeezed under pressure, pasteurized and membrane-filtered. The clear seasoning liquid had a full and harmonious taste.

EXAMPLE 2

150 g of wheat gluten were kneaded into a firm dough with the same amount of peameal as well as 15 g of raising agent and 15 g of curds, while 220 ml of water were added. The dough was shaped into bread and baked at 220° C. until it had adopted a light color. The process then processed as outlined in Example 1.

What is claimed is:

1. A process for the production of a seasoning sauce, in which an enzyme-containing, fungus-covered substrate is initially mashed with water containing sodium chloride, the mash is subjected to fermentation for a prolonged period of time and then clarified by squeezing, pasteurizing and filtration, wherein:
   a) the substrate comprises bread containing wheat gluten;
   b) the mashing is carried out with salt water, so that the salt content in the mash is from about 4 to about 12% by weight; and
   c) the fermentation is carried out in three steps, a first step is at a temperature of from about 40° to about 45° C. for about 4 to 14 days, a second step is at a temperature of from about 28° to about 32° C. for about 2 to about 4 weeks, and a third step is at room temperature of from about 18° to about 25° C. for about 6 weeks.

2. The process of claim 1, wherein the substrate comprises a bread made of from about 20 to about 80% by weight of wheat flour.

3. The process of claim 1 wherein the bread is in the form of slices or cubes.

4. The process of claim 1, which further comprises the addition of one or more microorganisms chosen from the group consisting of *Aspergillus oryzae* and *Zygosaccharomyces rouxii*, and combinations thereof.

5. The process of claim 4, wherein *Aspergillus oryzae* is added to the substrate before mashing and allowed to grow until a dense mycelium has developed and *Zygosaccharomyces rouxii* is added in the fermentation step.

6. The process of claim 1 wherein the first fermentation step is from about 8 to about 12 days.

7. The process of claim 1, wherein the initial fermentation step is carried about by heating to the fermentation temperature of 40° to 45° C. for from about 3 to about 5 days and then maintaining this temperature for about 4 to about 14 days, and the third fermentation step is for from about 2 to about 5 weeks.

* * * * *